United States Patent [19]

Speet et al.

[11] Patent Number: 4,814,941
[45] Date of Patent: Mar. 21, 1989

[54] POWER RECEPTACLE AND NESTED LINE CONDITIONER ARRANGEMENT

[75] Inventors: Larry A. Speet, Holland; Bruce A. Rentz, Belmont; Jan G. Wienczkowski, Kentwood, all of Mich.

[73] Assignee: Steelcase Inc., Grand Rapids, Mich.

[21] Appl. No.: 110,464

[22] Filed: Oct. 19, 1987

Related U.S. Application Data

[63] Continuation-in-part of Ser. No. 618,562, Jun. 8, 1984, Pat. No. 4,703,386.

[51] Int. Cl.[4] .............................................. H02B 1/08
[52] U.S. Cl. ...................................... 361/334; 361/56; 361/91; 361/111; 361/119; 174/49; 174/54; 174/61; 200/51.05; 200/51.11; 200/51.12
[58] Field of Search .................... 361/56, 58, 86, 91, 361/111, 113, 118, 119, 332, 334; 174/48, 49, 53, 54, 61; 429/210, 211; 200/51.05, 51.11, 51.12

[56] References Cited

U.S. PATENT DOCUMENTS

| 3,368,110 | 2/1968 | Taylor | 361/93 |
|---|---|---|---|
| 3,369,153 | 2/1968 | Arnold et al. | 361/56 |
| 3,435,293 | 3/1969 | Bodge | 361/56 |
| 3,452,252 | 6/1969 | Mapham | 361/56 |
| 3,518,489 | 6/1970 | Musham | 361/56 |
| 3,614,531 | 10/1971 | Oswald | 361/91 |
| 3,626,249 | 12/1971 | Snedeker | 361/56 |
| 3,636,385 | 1/1972 | Koepp | 307/304 |
| 3,656,024 | 4/1972 | Davis | 361/91 |
| 3,657,603 | 4/1972 | Adams | 361/91 X |
| 3,660,719 | 5/1972 | Grenier | 361/91 |
| 3,660,721 | 5/1972 | Baird | 361/56 |
| 3,660,724 | 5/1972 | Berger | 361/56 |
| 3,740,701 | 6/1973 | Harnden, Jr. | 338/220 |
| 3,743,888 | 7/1973 | Baumbach | 337/32 X |
| 3,818,271 | 6/1974 | Baumbach | 361/111 |
| 3,821,686 | 6/1974 | Harnden, Jr. | 338/21 |
| 3,840,781 | 10/1974 | Brown | 361/111 X |
| 3,869,648 | 3/1975 | Zendle et al. | 361/56 |
| 3,886,408 | 5/1975 | Klayum et al. | 361/56 X |
| 3,894,274 | 7/1975 | Rosenberry, Jr. | 361/56 |
| 3,904,931 | 9/1975 | Leidich | 361/56 |
| 3,928,737 | 12/1975 | Prasert | 307/114 |
| 3,949,271 | 4/1976 | Nercessian | 361/56 |
| 3,975,664 | 8/1976 | Baumbach | 361/111 X |
| 3,988,640 | 10/1976 | King | 361/56 |
| 4,023,071 | 5/1977 | Fussell | 361/56 |
| 4,050,092 | 9/1977 | Simokat | 361/56 |
| 4,068,277 | 1/1978 | Simokat | 361/56 X |
| 4,068,279 | 1/1978 | Byrnes | 361/56 |
| 4,071,872 | 1/1978 | Phillips, Jr. | 361/56 |
| 4,075,675 | 2/1978 | Phillips, Jr. | 361/56 |
| 4,089,032 | 5/1978 | Dell Orfano | 361/56 |
| 4,095,163 | 6/1978 | Montague | 307/237 X |

(List continued on next page.)

Primary Examiner—A. D. Pellinen
Assistant Examiner—Derek S. Jennings
Attorney, Agent, or Firm—Price, Heneveld, Cooper, DeWitt & Litton

[57] ABSTRACT

A power receptacle and nested line conditioner arrangement is provided for office partition systems and the like of the type having electrical power incorporated therein. The arrangement includes a power receptacle having a modular construction with a quick-disconnect that enables the same to be mounted at selected locations throughout the office partition system, and provide either conditioned or unconditioned power. The arrangement also includes a line conditioner having a quick-disconnect to couple the same with an associated receptacle. The line conditioner has a housing in which selected circuitry is encased, with a substantially C-shaped side elevational configuration comprising a web and opposite flanges defining a channel therebetween. The channel is shaped to closely receive an associated portion of the receptacle therein, such that the line conditioner nests around the rear face, and upper and lower walls of the receptacle, wholly within the ends of the receptacle, for increased space efficiency.

22 Claims, 4 Drawing Sheets

U.S PATENT DOCUMENTS

| | | | |
|---|---|---|---|
| 4,181,921 | 1/1980 | Taylor et al. | 361/56 |
| 4,191,985 | 3/1980 | Phillips, Jr. | 361/56 |
| 4,191,986 | 3/1980 | ta Huang et al. | 361/58 |
| 4,193,104 | 3/1980 | Nercessian | 361/56 |
| 4,210,906 | 7/1980 | Smith et al. | 361/91 X |
| 4,217,619 | 8/1980 | Tibolla | 361/91 X |
| 4,231,630 | 11/1980 | Propst et al. | 174/48 |
| 4,259,705 | 3/1981 | Stifter | 361/56 |
| 4,271,446 | 6/1981 | Comstock | 361/56 |
| 4,345,290 | 8/1982 | Johnson | 361/56 |
| 4,367,370 | 1/1983 | Wilson et al. | 174/48 |
| 4,376,651 | 3/1983 | Vanden Hoek et al. | 439/184 |
| 4,377,832 | 3/1983 | Toney et al. | 361/56 |
| 4,389,695 | 6/1983 | Carpenter, Jr. | 361/56 X |
| 4,390,919 | 6/1983 | Lesinski | 361/56 |
| 4,419,711 | 12/1983 | Seguin | 361/111 |
| 4,438,303 | 3/1984 | Astier | 200/51.1 |
| 4,703,386 | 10/1987 | Speet et al. | 361/56 |

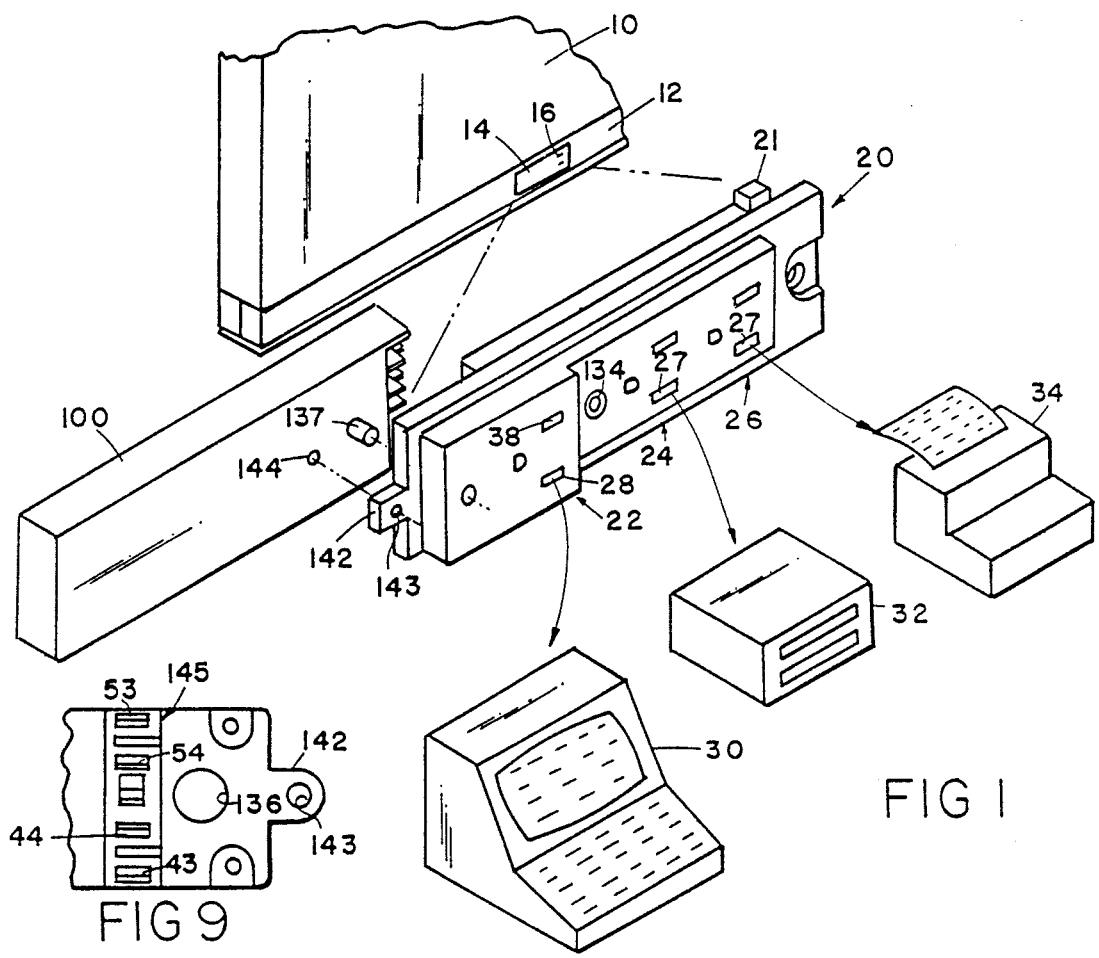
FIG 1
FIG 9
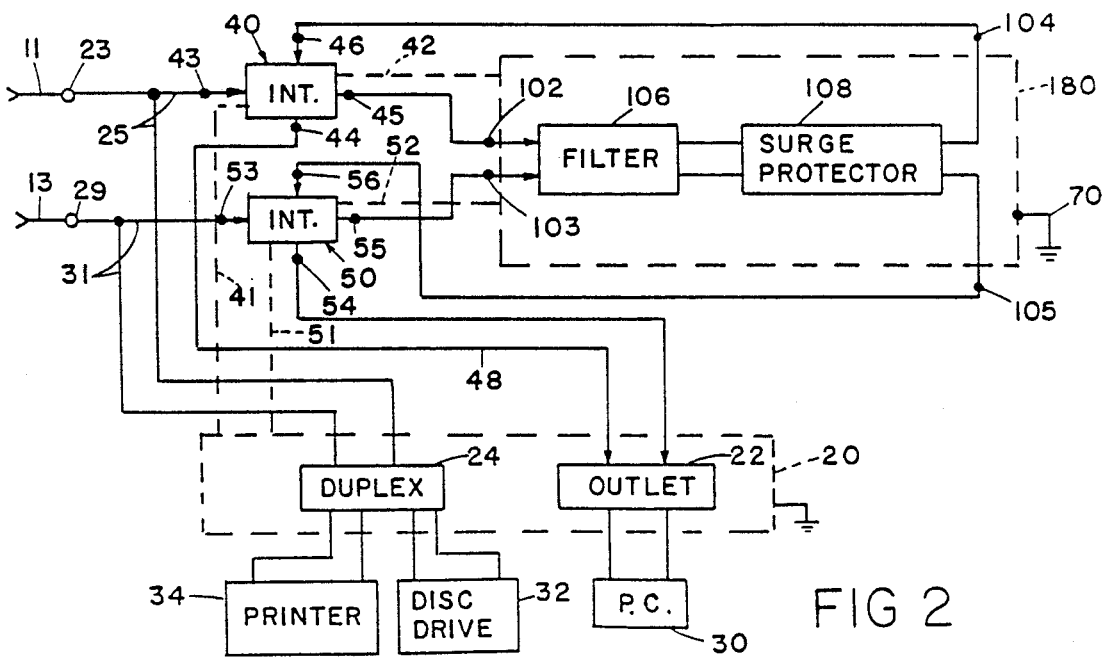
FIG 2

4,814,941

POWER RECEPTACLE AND NESTED LINE CONDITIONER ARRANGEMENT

CROSS REFERENCE TO RELATED APPLICATIONS

The present application is a continuation-in-part of copending U.S. patent application Ser. No. 618,562, filed June 8, 1984, now U.S. Pat. No. 4,703,386, which is hereby incorporated by reference.

BACKGROUND OF THE INVENTION

The present invention relates to a modular power receptacle and one which is adapted to receive a line conditioner module selectively filtering power supplied to one or more outlets of the receptacle.

In modern office designs in which panel wiring of the type disclosed, for example, in U.S. Pat. No. 4,376,561, issued Mar. 15, 1983, frequently, the work station defined by the panels employs computer equipment. Such equipment may include, for example, a personal computer terminal with a keyboard, monitor and microprocessor; a separate disk drive for the terminal; and a printer. All of the computer equipment is sensitive to power surges which frequently occur and which can destroy electrical components particularly integrated circuits. Further, the microprocessor and its associated circuitry contained within the personal computer is particularly sensitive to other power line voltage variations including E.M.I. (electromagnetic interference) and R.F.I. (radio frequency interference). The causes and deleterious effects of these additional power line disturbances are well known, and a line conditioning circuit frequently is used to isolate and filter the power source for at least the personal computer.

A variety of line conditioning circuits are available which plug into the front of a conventional wall outlet for use in connection with personal computing equipment. Such line filters typically include both a surge suppression circuit, as well as a low pass circuit for each of the outlets associated with the device. Thus, although filtering is available for the personal computer user, in the office environment, the use of such add-on filters in addition to the integrated power receptacles in the paneling system is costly, particularly where the somewhat unnecessary line conditioning and filtering is provided at all outlets including those for use with disk drives and printers which typically do not require the degree of protection necessary for the personal computer itself. Furthermore, the line conditioning and surge protection filter system available typically are plugged into existing outlets and do not aesthetically integrate well with an office panel system with integrated power distribution systems included in the paneling. Further, they can be easily removed from a work station by individuals with or without larcenous intent, thereby leaving the computing equipment unprotected sometimes without the knowledge of the operator.

SUMMARY OF THE PRESENT INVENTION

The system of the present invention provides a unique receptacle for use in a modular office panel power supply system. The receptacle includes a plurality of outlets at least one of which can be selectively electrically isolated from the remaining outlets for filtering of the isolated outlet. In one embodiment, the system includes a line conditioner having a cam which, when mechanically and electrically coupled to the receptacle, couples a surge protection circuit in parallel with each of the outlets of the receptacle and a line conditioning R.F.I./E.M.I. filter only in series with the isolated outlet for supplying power to a computer.

According to another aspect of the invention, means are provided for indicating when the line conditioner is installed such that the user is certain of the existence of the protection afforded by the line conditioner. The receptacle can thus be used as a normal receptacle or a filtered receptacle with the user knowing at a glance which mode is being employed.

In a preferred embodiment of the invention, the receptacle includes at least a pair of normally closed switch contacts which interact with a cam associated with a line conditioner for opening the power supply lines to at least one of the outlets associated with the receptacle and rerouting the line through the filter, and subsequently back to the other contact of the pair of contacts. With such a system, therefore, a modular receptacle can be employed in an existing office panel construction with a filter selectively added to provide the protection necessary only for the equipment needing such protection.

In another embodiment of the present invention, the line conditioner has a substantially C-shaped side elevational configuration, comprising a web and opposite flanges defining a channel therebetween. The channel is shaped to closely receive an associated portion of the receptacle therein, such that the line conditioner nests around the rear face, and upper and lower walls of the receptacle, wholly within the ends of the receptacle, for increased space efficiency.

These and other features, objects and advantages of the present invention will become apparent upon reading the following description thereof together with reference to the accompanying drawings in which:

BRIEF DESCRIPTION OF THE DRAWINGS

FIG. 1 is a fragmentary, perspective view of an office installation embodying the present invention;

FIG. 2 is an electrical circuit diagram in block form of a system embodying the present invention;

FIG. 9 is a fragmentary rear view of a portion of the power receptacle;

DETAILED DESCRIPTION OF THE PREFERRED EMBODIMENTS

Figure 10:
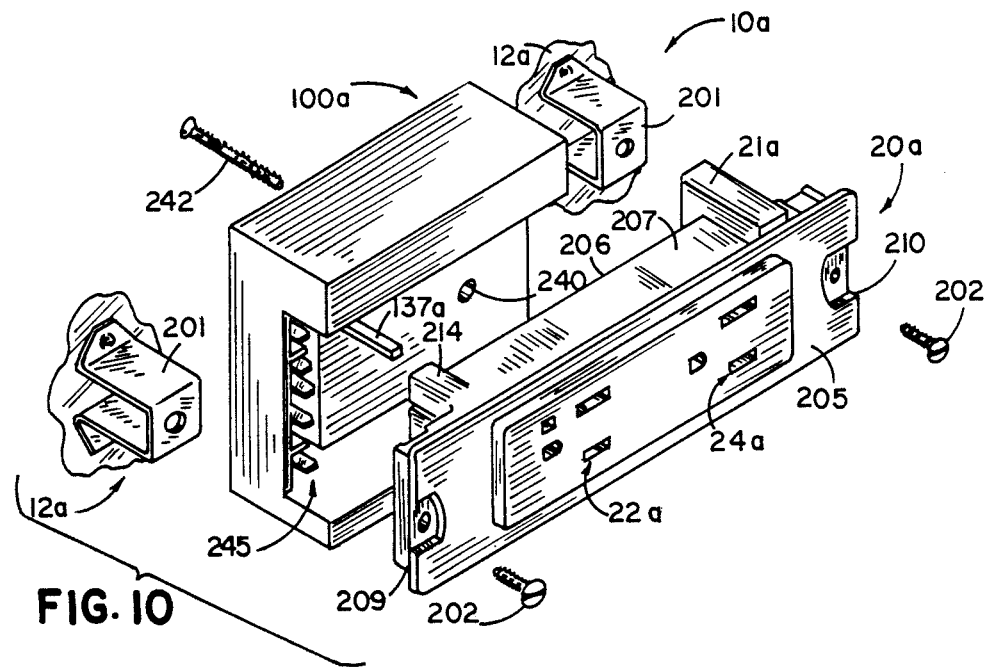
FIG. 10 is a fragmentary, perspective view of the office installation, and another embodiment of the present invention, comprising a power receptacle and nested line conditioner arrangement.
Figure 11:
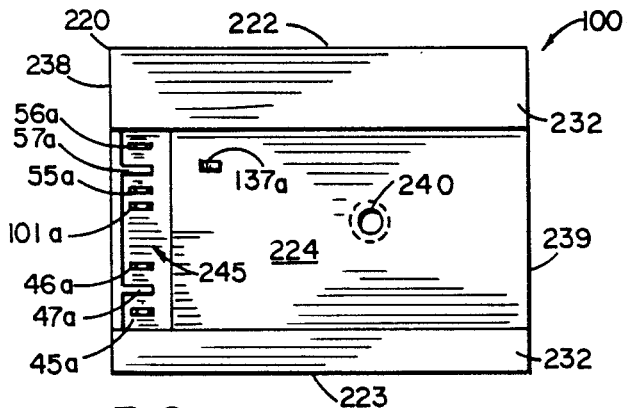
FIG. 11 is a front elevational view of the line conditioner shown in FIG. 10.

For purposes of description herein, the terms "upper," "lower," "right," "left," "rear," "front," "vertical," "horizontal," and derivatives thereof shall relate to the invention as oriented in FIGS. 1 and 10. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein, are not to be considered as limiting, unless the claims expressly state otherwise.

The Embodiment Shown In FIGS. 1–9

Referring initially to FIG. 1, there is shown an office installation 1 embodying the present invention in which an office panel 10 includes an electrical power raceway 12 generally of the type disclosed in U.S. Pat. No. 4,376,561, the disclosure of which is incorporated herein by reference. The raceway 12 thus includes a plurality of conductors extending along the bottom of the panel 10 in an appropriate channel and includes, at spaced intervals therealong, openings 14 for receiving plug-in electrical receptacles. In the past, such receptacles have been duplex receptacles which plug directly into power supplying connectors mounted in raceway 12 and aligned with one of the panel openings 14. The system described in the above-identified patent provides one or more power lines for different types of office equipment to be powered by the conductors as well as means for electrically interconnecting panels to form separate work areas.

In the embodiment shown in FIG. 1, a unique triplex receptacle 20 is adapted to fit within aperture 14 formed in the raceway 12, and plug into connector 16 for providing electrical operating power to the receptacle 20. Further, the triplex receptacle 20 is adapted to optionally receive a line conditioner 100 for selectively providing filtered and surge protection output power to the triplex receptacle 20. The assembly comprising receptacle 20 and line conditioner 100 is referenced herein by the numeral 5. In the embodiment shown, receptacle 20 includes three separate power output sockets 22, 24, and 26 with output 22 being filtered for E.M.I. and R.F.I. interference as well as being surge protected for connection of a personal computer 30 thereto. Sockets 24 and 26, on the other hand, are protected only for voltage surges and are particularly adapted for connection of a disk drive unit 32 or printer 34 associated with the computerized office.

Receptacle 20 includes one-half of a quick-disconnect coupling, which in the present example comprises a plug 21 located at its rear corner for connection to socket 16 in raceway 12 to provide operating power to sockets 22, 24 and 26 either directly when line conditioner 100 is not intercoupled to receptacle 20 or selectively with the filtering and surge protection noted above when line conditioner 100 is plugged into receptacle 20 and the combined unit 5 installed within raceway 12. In the embodiment shown in FIGS. 1–9, line conditioner 100 is positioned behind and to the left of receptacle 20 and is concealed within raceway 12 by inserting the conditioner 100 in aperture 14 and moving the conditioner 100 and attached receptacle 20 to the left as viewed in FIG. 1. When so installed, the receptacle 20 is aligned within the aperture and the conditioner which is positioned generally behind and to the left of the receptacle is contained within the raceway and is not visible. Plug 21 and socket 16 can be of the type described in the above-identified patent to provide a ground connection between raceway 12 and receptacle 20, a neutral connection and a line connection also commonly referred to as the "hot" connection for the receptacle. Having briefly described the environment and application of the unique receptacle 20 and line conditioner 100, a detailed description of the electrical circuit for the line conditioner 100 and its interconnection with receptacle 20 is provided followed by an electrical/mechanical description of the receptacle 20 and the line conditioner.

The interface between the receptacle 20 and line conditioner 100 is unique in that it provides interruption means for the otherwise parallelly connected sockets 22, 24 and 26 and inserts the line conditioner 100 selectively coupling certain portions of the line conditioner to selected ones of the sockets. Referring initially to FIG. 2, there is schematically shown the line input conductor 11 and a neutral conductor 13 of the electrical system, it being understood that a separate ground conductor also is coupled to the ground contacts of the sockets of receptacle 20.

Figure 8:
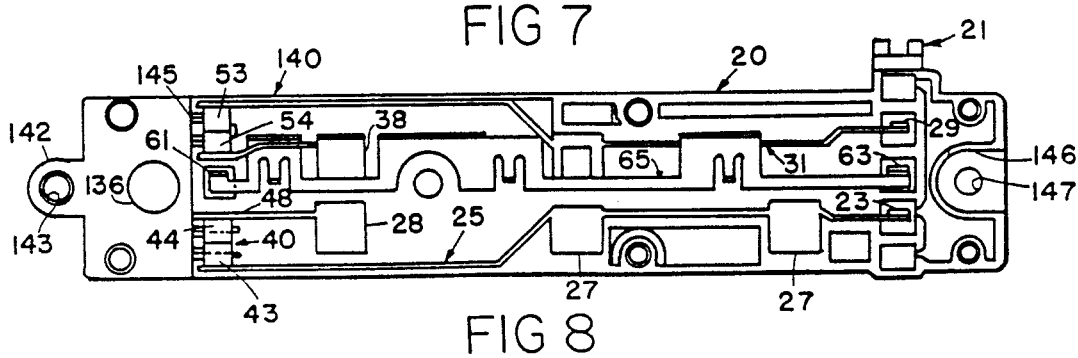
FIG. 8 is a front elevational view of the structure shown in FIG. 7 with the front cover removed showing the electrical conductors contained therein.

Line conductor 11 is coupled to the receptacle 20 by a pin 23 (FIG. 8) on plug 21 and is coupled by a preformed conductor 25 contained within housing 140 of receptacle 20 to each of the line contacts 27 of receptacles 24 and 26 and to an interruptible contact 40 associated with the line contact 28 of socket 22. The interruptible contact assembly 40 is represented in block form in FIG. 2 and is substantially identical to an interruptible contact 50 associated with the neutral input conductor 13 coupled to a configurated conductor 31 by input pin 29 on plug 21 (FIG. 8). Conductors 25 and 31 are coupled directly to the associated contacts of outlets 24 and 26, illustrated as a duplex outlet in FIG. 2, which includes contacts which are coupled permanently in parallel relationship to each other. Outlet 22, on the other hand, is either coupled in parallel with outlets 24 and 26 or isolated and coupled to input lines 11 and 13 through line conditioner 100.

The circuit interruption means 40 and 50 can take on a variety of forms, however, in the preferred embodiment, are electromechanically coupled contacts associated both with the receptacle 20, as indicated by dashed lines 41 and 51 in FIG. 2, and with the line filter 100, as indicated by the dashed lines 42 and 52. Thus, in the preferred embodiment of the invention, the interruption circuit means 40 and 50 are actuated by the insertion of the line conditioner 100 into the receptacle 20. The operation of the interruption means can be seen by reference to FIG. 2 which illustrates circuit 40 as including an input terminal 43 directly coupled to conductor 25 and an output terminal 44 which, in turn, is directly coupled to the line contact 28 of socket 22 via conductor 48. When conditioner 100 is not plugged into receptacle 20, circuit 40 effectively short circuits terminals 43 and 44 to coupled line 11 directly to contact 28 of outlet 22 via conductor 44.

The circuit interrupter 40 includes another output terminal 45 which is selectively coupled to terminal 43 upon insertion of conditioner 100 to receptacle 20 for coupling conductor 25 directly to an input terminal 102 of conditioner 100. A line output terminal 104 of conditioner 100 is coupled to an input terminal 46 of interrupter circuit 40 which, when conditioner 100 is inserted into receptacle 20, is coupled directly to output terminal 44. Thus, when the line conditioner is inserted into receptacle 20, terminals or contacts 43 and 45 are directly coupled while contacts 46 and 44 are coupled to one another. This couples the line input terminal 23 to the outlet line contact 28 through the line conditioner circuit 100. When the conditioner is not inserted into receptacle 20, however, contacts 43 and 44 are coupled to bypass line conditioner 100 and provide a direct parallel coupling of outlet 22 to outlets 24 and 26. Interrupter circuit 50 operates in substantially identical fashion and is shown with the same least significant digit terminal identifications with the output terminal 55 of interrupter circuit 50 being coupled to a neutral input terminal 103 of conditioner 100, and output terminal 105 of conditioner 100 being coupled to an input terminal 56 of interrupter circuit 50.

The line conditioning circuit 180 includes an R.F.I.-/E.M.I. filter 106 having its output terminals coupled to the input terminals of a surge protector circuit 108. Filter 106 and protection circuit 108 forming the line conditioner circuit 180 are shown in detail in FIG. 3, now described.

Figure 3:
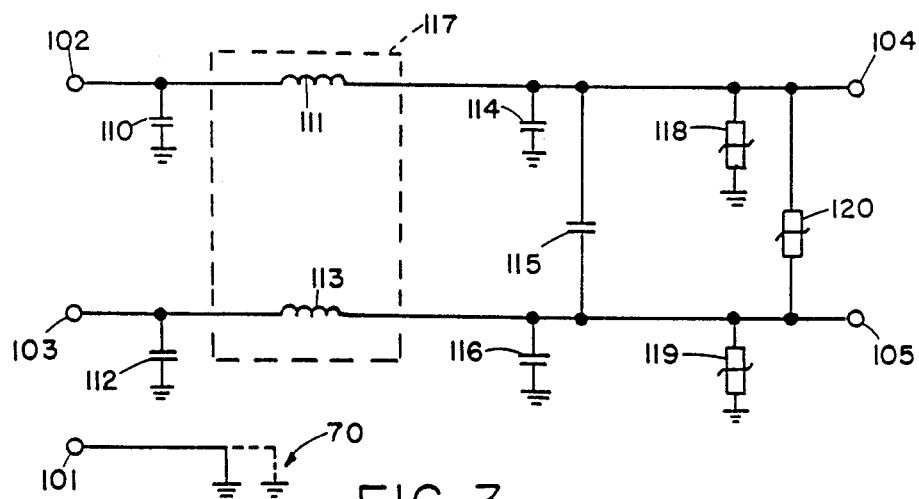
FIG. 3 is an electrical circuit diagram in schematic form of a line conditioner embodying the present invention.

The R.F.I./E.M.I. filter 106 includes a pair of input capacitors 110 and 112 coupled from input terminals 102 and 103, respectively, to ground. Coupled in series with terminals 102 and 103 are a pair of inductors 111 and 113 each having one input terminal coupled to a capacitor 110 and 112, respectively, and an output terminal coupled to output capacitors 114 and 116, respectively. The remaining terminals of capacitors 114 and 116 are coupled to ground, as shown in FIG. 3. A common mode bypass capacitor 115 extends between the output terminals of inductors 111 and 113 which are commonly wound on a toroidal core 117, as illustrated by the dotted lines in FIG. 3. The LC pi filter so defined provides a low pass filter which rejects, or bypasses, to ground the higher frequencies present in radio frequency interference or electromagnetic interference while freely passing the 50–60 Hz line frequency power.

The line conditioner 100 also includes the surge protection circuit comprising three varistors, with the first varistor 118 having one terminal coupled to output terminal 104 and the remaining terminal coupled to ground. A second varistor 119 has one terminal coupled to output terminal 105 and its remaining terminal coupled to ground, while the third varistor 120 is coupled between output terminals 104 and 105. The varistors prevent either of output terminals 104 or 105 from exceeding a predetermined voltage above ground level or with respect to each other. The values of the components of the E.M.I./R.F.I. filter as well as the varistors are conventional and each component is commercially available.

The ground shown in FIG. 3 is electrically coupled via a terminal 101 to a ground pin 61 (FIG. 8) in receptacle 20 which, in turn, is coupled via a ground conductor 65 and connection pin 63 of plug 21 to the ground conductor in the raceway via socket 16. Additionally, circuit 100 includes a radio frequency ground contact 70 (FIG. 6) mounted to the back and shown schematically in phantom form in FIG. 3. Ground contact 70 is also coupled to ground conductor 65 of the receptacle via contact 101.

It is noted that the line conditioner circuit 100 when coupled to the receptacle 20 inserts the electrical circuit path from terminal 102 to output terminal 104 in series with the line terminal 28 of outlet 22 and the circuit path from terminal 103 to output terminal 105 in series with the neutral contact 38 of the outlet. This effectively couples filter 106 and surge protector 108 in series with outlet 22. The surge protector circuit comprising the varistors are coupled electrically across terminals 102 and 103 through inductors 111 and 113, and therefore, also provide surge protection for the duplex outlets 24 and 26 which are coupled to input terminals 102 and 103. Filter 106, however, is not coupled to outlets 24 and 26 inasmuch as the devices plugged into such outlets are not as sensitive to high frequency interference as the microprocessor contained in personal computer 30. Having described the electrical circuitry comprising the receptacle and line conditioner, a description of the physical structure of the two units is now presented in conjunction with FIGS. 1 and 4–9.

Figure 5:
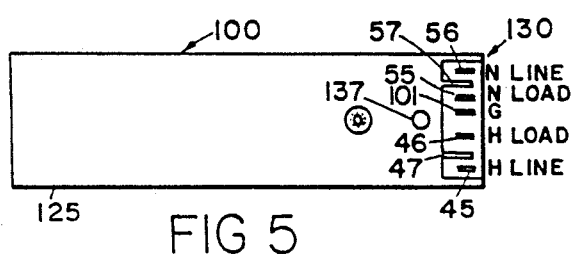
FIG. 5 is a slightly reduced sized, front elevational view of the line filter embodying the present invention.
Figure 4:
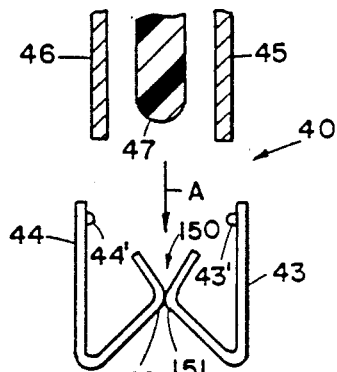
FIG. 4 is a greatly enlarged, fragmentary, crosssectional view of a portion of a power receptacle and the line conditioner.
Figure 6:
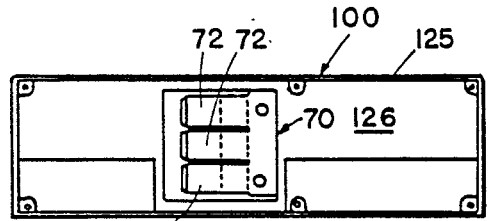
FIG. 6 is a rear elevational view of the line filter shown in FIG. 5.

FIG. 4 best illustrates the operation of the interruption circuit means 40 and 50 in the preferred embodiment of the invention. In FIG. 4, a normally closed switch is shown comprising spring contacts 43 and 44 which are mirror image, generally J-shaped conductive members. Contact 43 is integrally formed at the end of conductor 25, shown in FIG. 8, and contact 44 integrally formed with and coupled to outlet contact 28 by an intermediate section 48. Contact 43 includes, at its upper, inner end, a raised portion 43' for engaging the outer edge of contact 45 extending from plug 130 associated with line conditioner 100, as best seen in FIG. 5. Similarly, contact 44 includes a raised section 44' which engages contact 46 associated with line conditioner 100 when the line conditioner is plugged into the connector 145 (FIG. 9) at the rear of receptacle 20. The receptacle housing 140 is molded of a polymeric material, such as polycarbonate, which supports the contacts 43, 44, 61, 53 and 54 in spaced relationship aligned with a plurality of slots defining connector 145 which are aligned with the contacts of plug 130 such that the associated contacts on line conditioner 100 and receptacle 20 engage in electrical and mechanical contact when conditioner 100 is inserted into receptacle 20.

As the conditioner is plugged into receptacle 20 in a direction indicated by arrow A in FIG. 4, a pair of cams 47 and 57 (FIG. 5) spread apart contacts 43 and 44 and 53 and 54, respectively, decoupling input 43 from output 44 and input 53 from output 54, as seen in FIG. 2. This isolates the outlet 22 from inlet terminals 23 and 29 while at the same time coupling contact 43 to contact 45 and contact 44 to contact 46 and the associated contacts of the neutral side of line for inserting the line conditioner 100 in series between the input conductors 11 and 13 and outlet 22. Thus, the interrupter circuits 40 and 50 decouple the outlet 22 from outlets 24 and 26 and recouple the outlet through conditioner 100 by the electrical/mechanical connection of the two units. Cams 47 and 57 include a rounded tip which engages a V-shaped section 150 formed at the facing tips of each of the contacts 43, 44, and 53, 54 to spread apart the contacts sufficiently such that the contacting tips 151 and 152 will be separated to provide the electrical isolation while at the same time raised portions 43' and 44' will securely engage the outer edges of contacts 45 and 46. The neutral contact pair 53 and 54 are constructed in a substantially identical shape and operate in the same fashion.

The line conditioner also includes a molded polymeric body 125 and cams 47 and 57 are integrally molded therein and extend between contacts 45 and 46 and contacts 55 and 56, as shown in FIG. 5.

Figure 7:
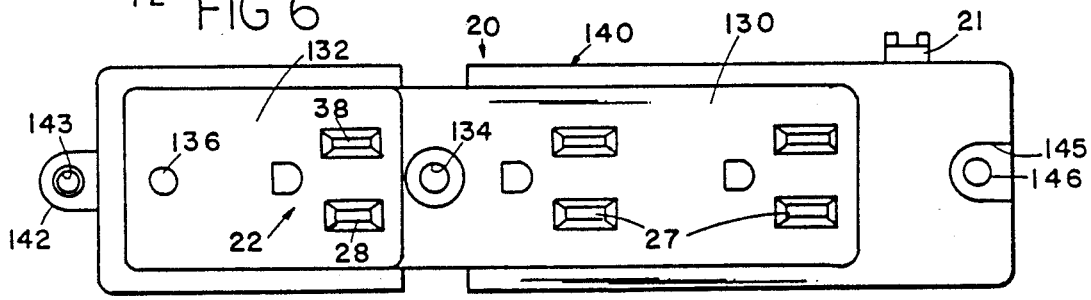
FIG. 7 is a front elevational view of the power receptacle embodying the present invention.

The radio frequency ground contact 70, shown in FIG. 7, comprises a beryllium copper strip formed as three outwardly deflected fingers 72 which extend rearwardly from the back 126 of conditioner 100 to engage the metallic raceway 12 and provide an additional ground for the filter 100 directly to the metallic raceway. This ground is also coupled to the electrical ground wire for the conductors contained within raceway 12 via contact 101 of plug 130 and contact 61 associated with connector 145 of receptacle 20.

Receptacle 20 includes a cover plate 130 with apertures aligned with each of the neutral and line contacts and ground and apertures aligned with the ground contacts in a conventional plug arrangement. The cover 130 includes a raised plateau 132 on socket 22 for indicating that it is a special purpose, high frequency, filtered socket for use with the personal computer 30. Cover 130 also includes a threaded aperture 134 for receiving a strain relief strap which can be used in connection with the plug for the personal computer also preventing accidental removal of the plug which could result in the loss of information in temporary memory.

The receptacle 20 also includes an aperture 136 extending entirely through the structure for defining in connection with the line conditioner means indicating that the line conditioner is installed. The line conditioner 100 accordingly includes an outwardly projecting cylindrical rod or post 137 which indexes to and aligns with aperture 136 extending through receptacle 20 to assist in the alignment of the two units and also extend to the surface of aperture 136 to provide a visible indicia that the line conditioner has been installed. For this purpose, the circular end surface of posts 137 can be of a color which contrasts sharply with the color of plateau 132 or, if desired, an LED can be mounted within the post 137 and activated upon the application of power to line conditioner 100 for providing an additional visible indicia indicating the activation of the filter.

The housing 140 to which cover 130 is removably secured in a conventional manner includes a tang 142 at one end including an aperture 143 for receiving a fastening screw which extends therethrough and into a threaded aperture 144 in line conditioner 100 for mechanically securing the two units for installation. The opposite end of housing 140 also includes a recess 146 and aperture 147 for securing the receptacle to the raceway 12. When the line conditioner and receptacle are secured together, the line conditioner is first inserted behind aperture 14 such that it is concealed within raceway 12 with only the triplex receptacle 20 being exposed once the system is installed. The indicia 137 will indicate to the user of the office that the circuit is protected against voltage surges and high frequency interference.

The interior of the receptacle housing 140 conventionally includes a plurality of contact supporting islands and projections not shown in FIG. 8 for purposes of clearly illustrating the contact construction. The structure of such housing is, however, conventional only in supporting the contacts and conductors and in permitting the necessary deflection of the interruptible contacts 43 and 44 and 53 and 54.

The Embodiments Shown in FIGS. 10-17

The reference numeral 5a designates another embodiment of the present invention having a nested receptacle 20a and line conditioner 100a arrangement. Since arrangement 5a is similar to the previously described arrangement 5, some similar parts appearing in FIGS. 1-9 and 10-17 respectively are represented by the same, corresponding reference numeral, except for the suffix "a" in the numerals of the latter.

In the office panel 10a (FIG. 10), electrical power raceway 12a includes pairs of U-shaped brackets 201 with threaded apertures through the exterior webs thereof to mount an associated receptacle 20a thereto by machine screws 202. Receptacle 20a (FIGS. 15-17) is substantially identical to receptacle 20, except that it has only two outlets 22a and 24a, such that it constitutes a duplex arrangement, in contrast to the triplex arrangement of receptacle 20.

Receptacle 20a (FIGS. 15-17) includes a front face plate 205, a rear face 206, upper and lower walls 207 and 208, and opposite ends 209 and 210. Receptacle 20a also includes one-half of a quick-disconnect coupling, which in this example comprises a plug 21a located at its right-hand rear corner for connection to socket 16a (FIG. 15) in raceway 12a to provide operating power to outlets 22a and 24a (FIG. 10) either directly when line conditioner is no not intercoupled to receptacle 20a, or selectively with the filtered and surge protection noted above when line conditioner 100a is plugged into receptacle 20a and the combined unit 5a installed within raceway 12a. A second quick-disconnect coupling, which in this example comprises a plug 214 is located at the opposite rear corner of receptacle 20a, and is shaped for attachment to a mating portion of line conditioner 100a, as described in greater detail hereinafter.

Line conditioner 100a (FIGS. 10-14) includes a hollow housing 220 in which circuitry 180a is encased. Housing 220 has a substantially C-shaped side elevational configuration (FIGS. 12 and 14), comprising a web 221 and opposite flanges 222 and 223 defining a space or channel 224 therebetween. The flanges 222 and 223 of housing 220 are spaced apart a distance slightly greater than the distance between the upper and lower walls 207 and 208 of receptacle 20a to closely receive receptacle 20a in channel 224, such that line conditioner 100a nests about the rear face 206, and upper and lower walls 207 and 208 respectively of receptacle 20a, wholly within the ends 209 and 210 of receptacle 20a to provide increased space efficiency. The nested arrangement 5a permits four line conditioners 100a to be connected with each panel 10a to provide greater convenience and flexibility during use.

Figure 12:
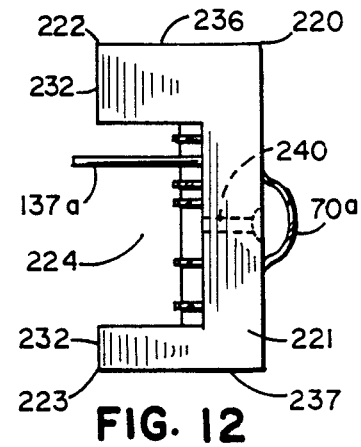
FIG. 12 is a side elevational view of the line conditioner shown in FIG. 10, taken from the right-hand side thereof.
Figure 13:
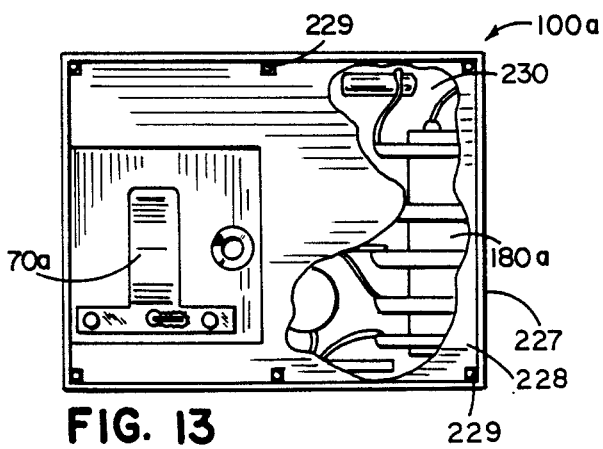
FIG. 13 is a rear elevational view of the line conditioner shown in FIG. 10, with portions thereof broken away to reveal internal construction.
Figure 14:
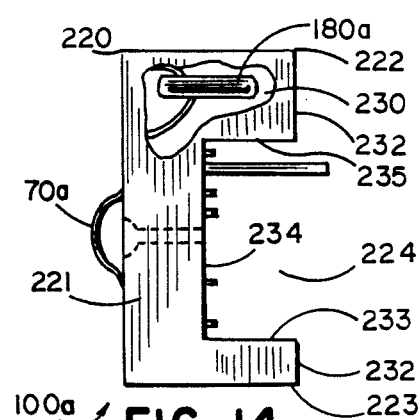
FIG. 14 is a side elevational view of the line conditioner shown in FIG. 10, taken from the left-hand side thereof, and with portions thereof broken away to reveal internal construction.

In the illustrated example, housing 220 (FIGS. 10-14) has a two-piece construction, comprising a hollow, molded forward half 227 having an open back, and a mating, flat back panel 228 attached thereto by suitable means, such as the illustrated rivets or studs 229. Housing 220 is preferably molded from an electrically insulative material, such as a rigid plastic. The web 221, and both flanges 222 of housing 220 are each hollow, and receive therein at least a portion of circuitry 180, as best illustrated in FIGS. 13 and 14. The various components or elements of circuitry 180a are first positioned within the forward half 227 of conditioner 100a, extending into the interior of flanges 222 and 223, as well as web 221, and are then set in place by a suitable potting material 230. Back panel 228 is then fixedly attached to the forward half 227 of housing 220 by studs 229.

Figure 15:
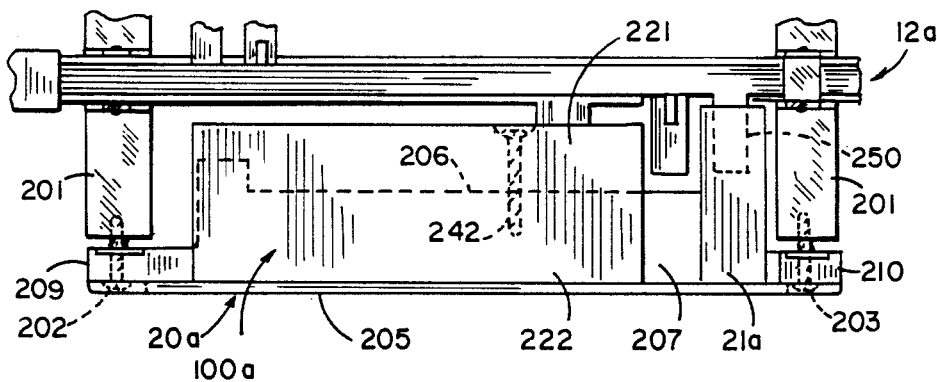
FIG. 15 is a top plan view of the power receptacle and line conditioner illustrated in FIG. 10, shown mounted in a fragmentary portion of the office installation.

Preferably, the depth of the web portion 221 of housing 220 is minimized, so as to reduce the overall thickness of raceway 12a. In the illustrated example, the depth of housing web 221 is substantially less than the depth of housing flanges 220 and 223, as best illustrated in FIGS. 12 and 14. The depth of housing flanges 220 and 223 is maximized to provide additional room for housing circuitry 180a. As best illustrated in FIGS. 15∫14, when unit 5a is assembled on raceway 12a, the end walls 232 of flanges 222 and 223 are disposed adjacent to the interior surface of the receptacle front face plate 205. In the example shown in FIGS. 10-17, upper flange 222 is thicker than lower flange 223.

Figure 16:
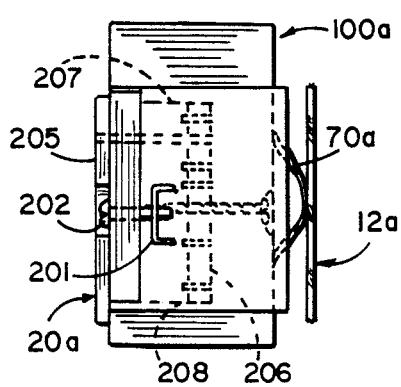
FIG. 16 is a side elevational view of the receptacle and line conditioner illustrated in FIG. 10, as attached to the office installation, taken from the right-hand side thereof, and with portions thereof broken away.
Figure 17:
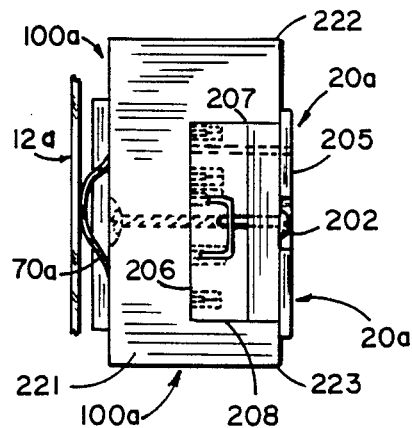
FIG. 17 is a side elevational view of the receptacle and line conditioner assembly shown in FIG. 10, as attached to the office installation, taken from the right-hand side thereof, and with portions thereof broken away.

In the illustrated example, the channel 224 (FIGS. 11-14) of housing 220 has a substantially rectangular side elevational shape, which is generally uniform along its length. Housing half 227 includes walls 223-235 which define channel 224, upper and lower walls 236 and 237 respectively, and end walls 238 and 239. An aperture 140 extends through line conditioner 100a, and is adapted to receive therein a threaded fastener 242 to positively interconnect line conditioner 100a and receptacle 20a. A post 137a projects forwardly from wall 234 of housing 220, and is aligned with and extends through a mating indicator aperture 136a in receptacle 20a when receptacle 20a and line conditioner 100a are assembled to provide indicia visible from the exterior of the partition system indicating that line conditioner 100a is installed. The other half of a quick-disconnect coupling to interconnect receptacle 20a and line conditioner 100a comprises a socket 245 which mates with plug 214. Socket 245 includes contacts 45a, 46a, 101a, 55a and 56a, which project forwardly from wall 234 of housing 220, adjacent the left-hand end thereof (as viewed in FIG. 11) and mate with the plug 214 of receptacle 20a to electrically interconnect the same. Cams 47a and 57a are also provided adjacent contacts 45a, 46a, 101a, 55a and 56a, and serve to spread apart the mating contacts in receptacle 20a in the manner discussed above. A flexible radio frequency ground contact 70a is mounted on the back panel 228 of housing 220, and contacts the metal portion of raceway 12a, as best shown in FIGS. 15-17.

In operation, a receptacle 20a is installed in panel system 10a at each location at which a tap for electrical power is desired. To attach a receptacle 20a to panel system 10a, plug 21a is inserted into a mating receptacle or socket 16a (FIG. 15), and fasteners 202 and 203 are connected with brackets 201.

In the event that conditioned electrical power is desired, a line conditioner 100a is connected with the associated receptacle 20a in the following manner. Line conditioner 100a is oriented, such that contacts 45a, 46a, 101a, 55a are aligned with plug 214. Line conditioner 100a and receptacle 20a are then converged, so as to engage contacts 45a, 46a, 101a, 55a and 56a with plug 214, such that the body portion of receptacle 20a is closely received within the channel 224 of line conditioner 100a. Fastener 242 is then inserted through aperture 240 from the rear side of line conditioner 100a, and engaged into a mating threaded aperture in receptacle 20a to positively interconnect line conditioner 100a with receptacle 20a. The line conditioner 100a and receptacle 20a assembly 5a is then attached to the panel system by engaging plug 21a with socket 16a, and fastening screws 202 with brackets 201 in the manner described above.

It will become apparent to those skilled in the art that various modifications to the preferred embodiments of the present invention as described herein can be made without departing from the spirit or scope hereof as defined by the appended claims.

The embodiments of the invention in which an exclusive property or privilege is claimed are defined as follows:

1. A power receptacle and nested line conditioner arrangement for office partition systems, and the like, comprising:

a power receptacle having a front face, a rear face, upper and lower walls and opposite ends; said front face of said receptacle having at least one outlet therein; said rear face of said receptacle having a first coupling means for selectively coupling said outlet to a source of line voltage associated with an office partition system, and a second coupling means disposed between the ends of said receptacle;

a line conditioner having means for conditioning power supplied from the source of line voltage, and means on said line conditioner for mechanically and electrically coupling said line conditioner with the second coupling means on said receptacle to position said line conditioner between the ends of said receptacle, and condition power to said outlet; said line conditioner including a housing encasing said power conditioning means, and having a substantially C-shaped side elevational configuration comprising a web and opposite flanges defining a channel therebetween; said housing flanges being spaced apart a distance slightly greater than the distance between the upper and lower walls of said receptacle to closely receive said receptacle in the channel of said line conditioner, such that said line conditioner nests about the rear face, and upper and lower walls of said receptacle, wholly within the ends thereof, for increased space efficiency.

2. A power receptacle and nested line conditioner arrangement as set forth in claim 1, wherein:

said web and said flanges of said housing are each hollow, and each retain therein at least a portion of said power conditioning means.

3. A power receptacle and nested line conditioner arrangement as set forth in claim 2, wherein:
said web and said flanges each have a depth, with the depth of said web being substantially less than the depth of said flanges to permit reduced overall thickness of the office partition system.

4. A power receptacle and nested line conditioner arrangement as set forth in claim 3, wherein:
said receptacle includes a face plate defining the front face thereof in which said outlet is disposed;
said flanges of said line conditioner housing include end walls which are disposed adjacent to said face plate when said line conditioner is assembled on said receptacle.

5. A power receptacle and nested line conditioner arrangement as set forth in claim 4, wherein:
said receptacle has a modular construction adapted for use throughout the office partition system to supply either conditioned or unconditioned line voltage thereto;
said first coupling means on said receptacle comprises one-half of a quick-disconnect, mating plug and socket arrangement to facilitate coupling said receptacle to the office partition system; and
said second coupling means on said receptacle and said coupling means on said line connector comprises one-half of a quick-disconnect, mating plug and socket arrangement to facilitate interconnecting said receptacle and said line conditioner.

6. A power receptacle and nested line conditioner arrangement as set forth in claim 5, wherein:
said channel in said line conditioner housing has a substantially rectangular side elevational shape that is substantially uniform along its length.

7. A power receptacle and nested line conditioner arrangement as set forth in claim 6, including:
a removable fastener positively interconnecting said receptacle and said line conditioner when assembled.

8. A power receptacle and nested line conditioner arrangement as set forth in claim 7, wherein:
said receptacle includes switch means for isolating at least one of said outlets from the remaining outlets, comprising a pair of normally closed contacts extending within said second coupling means to be opened and reconnected to said line conditioner upon connection of said line conditioner to said receptacle, whereby said one outlet is conditioned by said line conditioner.

9. A power receptacle and nested line conditioner arrangement as set forth in claim 8, wherein:
said line conditioner includes a cam engaging and separating said pair of switch contacts, and contact means for engaging said pair of switch contacts for electrically coupling said line conditioner to said receptacle.

10. A power receptacle and nested line conditioner arrangement as set forth in claim 9, wherein:
said receptacle includes an indicator aperture through the front plate thereof;
said line conditioner includes a post aligned with and extending through said indicator aperture when said receptacle and said line conditioner are assembled to provide indicia visible from the exterior of the partition system indicating that said line conditioner is installed.

11. A power receptacle and nested line conditioner arrangement as set forth in claim 10, wherein:
said power conditioning means comprises a filter for filtering out E.M.I. and R.F.I. frequency interference, and a surge protection circuit coupled to said filter for preventing excessive voltage surges.

12. A power receptacle and nested line conditioner arrangement as set forth in claim 1, wherein:
said web and said flanges each have a depth, with the depth of said web substantially less than the depth of said flanges to permit reduced overall thickness of the office partition system.

13. A power receptacle and nested line conditioner arrangement as set forth in claim 1, wherein:
said receptacle includes a face plate defining the front face thereof in which said outlet is disposed;
said flanges of said line conditioner housing include end walls which are disposed adjacent to said face plate when said line conditioner is assembled on said receptacle.

14. A power receptacle and nested line conditioner arrangement as set forth in claim 1, wherein:
said receptacle has a modular construction adapted for use throughout the office partition system to supply either conditioned or unconditioned line voltage thereto;
said first coupling means on said receptacle comprises one-half of a quick-disconnect, mating plug and socket arrangement to facilitate coupling said receptacle to the office partition system; and
said second coupling means on said receptacle and said coupling means on said line connector comprises one-half of a quick-disconnect, mating plug and socket arrangement to facilitate interconnecting said receptacle and said line conditioner.

15. A power receptacle and nested line conditioner arrangement as set forth in claim 1, wherein:
said channel in said line conditioner housing has a substantially rectangular side elevational shape that is substantially uniform along its length.

16. A power receptacle and nested line conditioner arrangement as set forth in claim 1, including:
a removable fastener positively connecting said receptacle and said line conditioner when assembled.

17. A power receptacle and nested line conditioner arrangement as set forth in claim 1, wherein:
said receptacle includes switch means for isolating at least one of said outlets from the remaining outlets, comprising a pair of normally closed contacts extending within said second coupling means to be opened and reconnected to said line conditioner upon connection of said line conditioner to said receptacle, whereby said one outlet is conditioned by said line conditioner.

18. A power receptacle and nested line conditioner arrangement as set forth in claim 17, wherein:
said line conditioner includes a cam engaging and separating said pair of switch contacts, and contact means for engaging said pair of switch contacts for electrically coupling said line conditioner to said receptacle.

19. A power receptacle and nested line conditioner arrangement as set forth in claim 1, wherein:
said receptacle includes an indicator aperture through the front face thereof; and
said line conditioner includes a post aligned with and extending through said indicator aperture when said receptacle and said line conditioner are assembled to provide indicia visible from the exterior of the partition system indicating that said line conditioner is installed.

20. A power receptacle and nested line conditioner arrangement as set forth in claim 1, wherein:
said power conditioning means comprises a filter for filtering out E.M.I. and R.F.I. frequency interference, and a surge protection circuit coupled to said filter for preventing excessive voltage surges.

21. In an office partition system of the type having electrical power therein, the improvement of a power receptacle and nested line conditioner arrangement comprising:
a power receptacle having a front face, a rear face, upper and lower walls and opposite ends; said front face of said receptacle having at least one outlet therein; said rear face of said receptacle having a first coupling means for selectively coupling said outlet to a source of line voltage associated with said office partition system, and a second coupling means disposed between the ends of said receptacle;
a line conditioner having means for conditioning power supplied from the source of line voltage, and means on said line conditioner for mechanically and electrically coupling said line conditioner with the second coupling means of said receptacle to position said line conditioner between the ends of said receptacle, and condition power to said outlet; said line conditioner including a housing encasing said power conditioning means, and having a substantially C-shaped side elevational configuration comprising a web and opposite flanges defining a channel therebetween; said housing flanges being spaced apart a distance slightly greater than the distance between the upper and lower walls of said receptacle to closely receive said receptacle in the channel of said line conditioner, such that said line conditioner nests about the rear face, and upper and lower walls of said receptacle, wholly within the ends thereof, for improved space efficiency.

22. A line conditioner for power receptacles of the type used in office partition systems, and the like, said line conditioner comprising:
means for conditioning power supplied from a source of line voltage;
means for mechanically and electrically coupling said line conditioner with an associated power receptacle to position said line conditioner between opposite ends of the power receptacle, and
a housing encasing said power conditioning means, and having a substantially C-shaped side elevational configuration, comprising a web and opposite flanges defining a channel therebetween; said housing flanges being space apart a distance slightly greater than the height of the power receptacle to closely receive the power receptacle in the channel of said line conditioner, such that said line conditioner nests about rear, upper, and lower walls of the receptacle, wholly within the ends thereof, for increased

* * * * *

UNITED STATES PATENT AND TRADEMARK OFFICE
CERTIFICATE OF CORRECTION

PATENT NO. : 4,814,941

DATED : March 21, 1989

INVENTOR(S) : Larry A. Speet

It is certified that error appears in the above-identified patent and that said Letters Patent is hereby corrected as shown below:

Column 2, lines 48 and 49:
"crosssectional" should be -- cross-sectional";

Column 8, line 53:
after "is" delete --no--;

Column 9, line 34:
"15 $\int$ 14," should be --15-17--;

Column 9, line 42:
"223-235" should be --233-235--;

Column 10, line 11:
after "55a" insert --and 56a--'

Column 14, Claim 22, line 24;
"space" should be - spaced- ; and

Column 14, Claim 22, line 30:
after "increased" insert --space efficiency--.

Signed and Sealed this

Twenty-seventh Day of March, 1990

Attest:

JEFFREY M. SAMUELS

Attesting Officer

Acting Commissioner of Patents and Trademarks